United States Patent [19]

Holtkamp

[11] 4,434,577

[45] Mar. 6, 1984

[54] CAPILLARY DISC AND SUPPORT THEREFOR

[76] Inventor: Reinhold Holtkamp, Werther Strasse 112, 4294 Isselburg, Fed. Rep. of Germany

[21] Appl. No.: 430,964

[22] Filed: Sep. 30, 1982

[51] Int. Cl.³ .............................................. A01G 25/00
[52] U.S. Cl. .......................................... 47/81; 47/67; 47/71
[58] Field of Search ................................ 47/81, 67, 71

[56] References Cited

U.S. PATENT DOCUMENTS

| | | |
|---|---|---|
| 1,264,096 | 4/1918 | Lelievre . |
| 1,342,786 | 6/1920 | White . |
| 2,346,029 | 4/1944 | Jennings . |
| 2,810,235 | 10/1957 | Magid ..................................... 47/81 |
| 3,220,144 | 11/1965 | Green . |
| 3,298,133 | 1/1967 | Courtright . |
| 3,576,088 | 1/1967 | Arca . |
| 3,753,315 | 8/1973 | Adam . |
| 3,769,748 | 11/1973 | Goldring . |
| 3,775,904 | 12/1973 | Peters . |
| 4,096,663 | 6/1978 | Silver . |
| 4,343,109 | 8/1982 | Holtkamp ............................... 47/81 |

FOREIGN PATENT DOCUMENTS

| | | |
|---|---|---|
| 1468863 | 1/1967 | France . |
| 1544194 | 9/1968 | France . |
| 10693 | of 1908 | United Kingdom . |
| 1200457 | 7/1970 | United Kingdom ..................... 47/81 |

*Primary Examiner*—Robert A. Hafer
*Assistant Examiner*—Bradley M. Lewis
*Attorney, Agent, or Firm*—Schwartz, Jeffery, Schwaab, Mack, Blumenthal & Koch

[57] ABSTRACT

A watering device for potten plants comprising a support disc and a plurality of arcuately spaced legs extending downwardly and outwardly from the disc so as to elevate said disc from the bottom of a tray. A pad is positioned on said disc, with the pad having a hinged movable tab which can be bent downwardly through an opening formed in the disc for submergence in the water in the tray. The tray is formed with arcuately spaced pockets which receive the legs of the support and which extend below the bottom wall of the tray so as to elevate the same from a supporting surface.

7 Claims, 3 Drawing Figures

CAPILLARY DISC AND SUPPORT THEREFOR

BACKGROUND OF THE INVENTION

The present invention relates as indicated to a capillary disc and support therefor, and relates more particularly to a disc and support adapted to be used in a flower pot environment to improve the transfer of water from a tray or the like to the pot and thus the growing media by means of capillary action.

In my issued U.S. Pat. No. 4,343,109, granted Aug. 10, 1982, there is disclosed a capillary disc and support of the same general type as the present invention, which constitutes an improvement thereover. There are a number of similarities between the respective structures, with both having a disc elevated from the bottom of a supporting tray by legs and formed with a center opening downwardly through which a wick of a water permeable pad can extend for submergence in water in the tray. In this manner, water can be transmitted by capillary action from the pad to and uniformly throughout the pad for providing water to a pot positioned on the pad. The construction of the pat forms no part of the present invention, and in the usual manner is formed with a plurality of radially and arcuately spaced openings therein which serve both as drainage and watering openings, depending upon the watering techniques for the plant positioned in the pot.

While the capillary disc and support shown in my earlier patent are more than satisfactory for the purpose intended, there are certain disadvantages owing to the construction of the disc and integrally formed legs which support the disc in an elevated position from the bottom of the tray. First of all, the supporting legs simply rest on the bottom of the tray, and the disc is susceptible to movement and even tipping in the event the pot is not properly positioned on the pad located at the top of the disc. Secondly, the supporting legs extend generally perpendicularly downwardly from the disc thereby making it difficult to efficiently ship and store the disc and consequently increasing the unit cost of the system.

Although prior art devices of this general type have employed outwardly and downwardly tapered supporting legs in a capillary type watering environment, they possess certain production or functional disadvantages. The use of an annular outwardly flared support for a pot is disclosed in U.S. Pat. No. 4,096,663 to S. M. Silver, but the flared support flange forms part of a generally cylindrical outer container thereby greatly increasing the production costs. Moreover, the disc and pad arrangement of Silver are dissimilar to that of the present invention.

Green, U.S. Pat. No. 3,220,144, is similar in relevance, disclosing an annular outwardly flared skirt which rests on the bottom of the reservoir tray.

British Pat. No. 1,200,457 similarly discloses an annular outwardly flared skirt on a support disc, with the supporing tray being provided with diametrically opposed thin lugs which are positioned in slots formed in the skirt for positioning the same in the tray. The skirt, being annular, results in increased manufacturing costs, and the relatively thin lugs are susceptible to breaking thereby potentially disrupting the locking arrangement.

SUMMARY OF THE INVENTION

An important feature of the present invention is to provide a simple and inexpensive capillary disc and support by means of which the bottom of a pot can be placed in moisture contact with the pad throughout substantially the entire area of the bottom of the pot. In accordance with the invention, the pad is highly pervious so as to transmit water from the reservoir into the pad, the dimensions of which are such that the entire bottom of the pot is in contact with the pad. The pot is preferably formed with a plurality of openings in the bottom wall by means of which the moisture is transmitted to the growing media. The openings are preferably spaced so as to provide uniform moisture transmission to the growing media.

A further important feature of the present invention is the novel structure and relationship of the pad and support. The support is provided with a preferably centrally located opening, and the pad is cut in an area aligned with such opening so as to provide a tab which can be bent downwardly into the water bath. In this manner, water is transmitted by means of the tab to the pad through capillary action, thereby watering the growing media. The dimensions of the tab and the size of the opening formed in the support are such that a suitable amount of water is transmitted through the tab to the pad for transfer to the growing media. If desired, the tab can be formed of a plurality of sections one or more of which can be struck or bent downwardly into the water bath so as to vary the amount of water transmitted by capillary action, thereby providing optimum watering condition for plants requiring various amounts of moisture. The support for the pad is preferably positioned above the level of water in the tray surrounding the pad and support so the water transmission is confined to water transmitted by capillary action through the tab. The pad and support are preferably positioned in a tray or the like, with the outer peripheries of the pad and support being spaced from the upper edges of the tray so that water can be added to the tray as necessary.

Another feature of the invention is the construction and arrangement of the support disc and the tray in such a manner that the disc is firmly locked in place in the tray. In accordance with the invention, the disc is formed with a plurality of arcuately spaced legs, there being five legs illustrated in the form shown, and these legs are positioned at the bottom regions thereof into pockets formed in the tray. The pockets are of course arcuately spaced to accommodate spacing of the legs, and are sufficiently deep to accommodate the legs for locking purposes. An additional advantage of the pocket formed in the tray is the extension thereof below the bottom plane of the tray. In this manner, the tray is supported by the pockets as opposed to the bottom of the tray, thus elevating the tray from the supporting surface. In this manner, the transfer of moisture from the bottom of the tray to such supporting surface is entirely avoided.

A still further advantage of the invention is the ability of the support discs to be stacked during shipment and storage. The supporting legs are outwardly tapered, and a plurality of support discs can be superimposed in a nesting relation, thereby reducing shipping space and consequent cost, and also reducing storage space at the sales level. The tray, being formed with an upwardly and outwardly inclined side wall, can similarly be stacked for shipment and storage.

These and other objects of the invention will be apparent as the following description proceeds, in particular reference to the application drawings.

BRIEF DESCRIPTION OF THE APPLICATION DRAWING

DETAILED DESCRIPTION OF THE PREFERRED EMBODIMENTS

Figure 1:
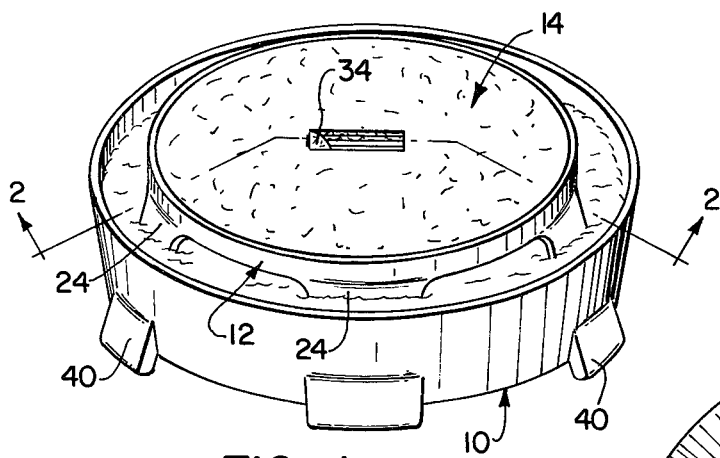
FIG. 1 is a perspective view of the pad and support, shown mounted in a tray.

Referring to the application drawings, wherein like parts are indicated by like reference numerals, a tray is generally indicated at 10, and positioned in the tray is a support generally indicated at 12, which includes a flat upper disc 13. A pad generally indicated at 14 is positioned on the support, with the support including an upwardly extending flange or rim 15 within which the pad is positioned. The pad is thus retained in place on the support disc. As shown in the drawing figures, both the pad and support are generally circular in configuration, although it will be understood that other shapes could be employed as well. The circular configuration is preferred, however, in view of the normally round bottom of plant pots, with the pot being generally indicated at 16 in FIG. 2. The tray 10 has a flat bottom 18 and a continuous outwardly and upwardly inclined side wall 20, with the diameter of the upper edge of the wall 20 of the tray being preferably somewhat larger than the diameters of the support and pad so as to permit the pouring of water into the tray to maintain the water level WL at the desired level.

Figure 2:
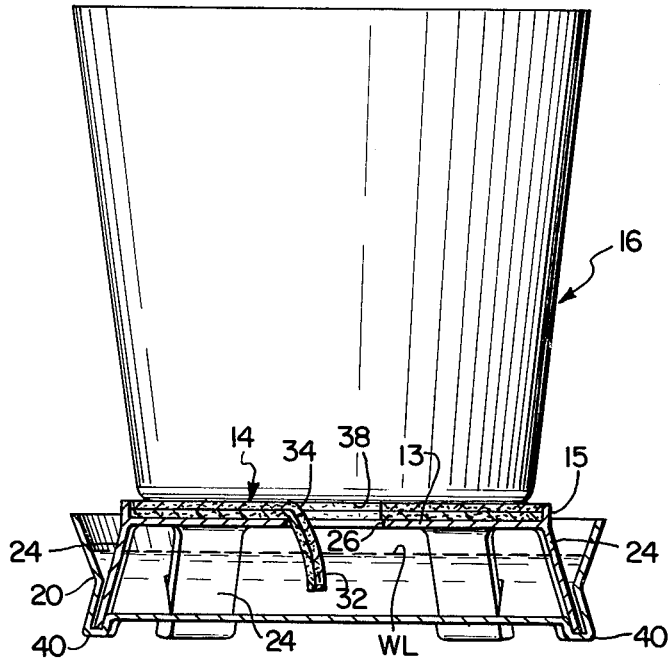
FIG. 2 is a vertical cross-sectional view taken on line 2—2 of FIG. 1, with the pot being shown in elevation, of the support and pad mounted in the tray.

A plurality of supporting legs 24 are in the form shown integrally formed with the support and extend outwardly and downwardly from the periphery thereof. The number of legs 24 can vary as desired, with there being five shown in the illustrated form, preferably equally spaced arcuately around the periphery of the support. The support 12, including the legs, is preferably formed of a plastic material, and can be economically manufactured by conventional injection molding or other molding techniques well known in the art. The rigidity of the plastic is such that the support can adequately support a potted plant as shown in FIG. 2, with or without the locking engagement of the legs with the tray as illustrated in that figure and as will be presently described.

As above noted, the provision of the downwardly and outwardly tapered legs has certain distinct advantages from the standpoint of shipping and storage. A plurality of supports can be stacked in nesting relation one on top of the other thereby reducing shipping and storage space. Moreover, the provision of legs, as opposed to an annular skirt, substantially reduces material costs without detracting from the appearance or function of the assembled unit.

The disc 13 is formed with a centrally located slot 26 which in the form shown is generally rectangular in cross-section. The pad 14, which is shown comprises two separate layers 28 and 30, is cut in the central portion thereof so as to provide a tab 32 corresponding in shape to the slot 26 formed in the support disc. Thus, the tab 32 can be bent downwardly from the plane of the pad for submergence in the water in the tray, as shown in FIG. 2. Although a single tab is shown in the application drawing, it will be understood that a plurality of tabs or tab sections could be provided so as to permit varying degrees of cross-sectional areas to be submerged in the water to consequently provide varying amounts of moisture transmission by capillary action. By such action, water is transmitted from the tab to the pad, substantially throughout the entire area thereof.

It will be noted that the tab is formed by a series of three separate cuts, with a hinge portion 34 connecting the tab to the remainder of the pad.

As above noted, the pad 14 must of course be water pervious, and in the form shown comprises two separate layers 28 and 30. The pad materials are preferably selected so as to provide optimum moisture transferring capabilities, and a plastic material, or a combination of plastic and wool, have proven entirely satisfactory for this purpose. Where two pads are employed as illustrated, they are bonded together in selected areas as necessary to provide a unitary pad assembly. Although two separate layers are shown, it will be understood that a single layer may alternately be provided.

Figure 3:
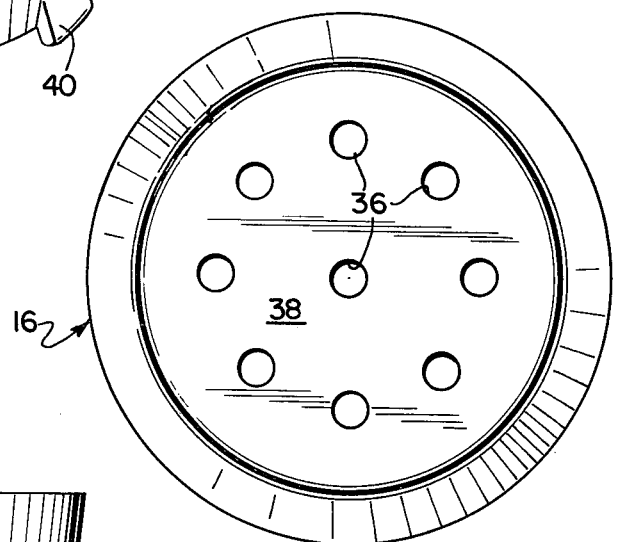
FIG. 3 is a bottom plan view of the pot by itself, showing the openings formed in the bottom thereof for transfer of moisture by means of capillary action.

Referring to FIG. 3, the pot 16 is illustrated therein as being provided with a plurality of openings commonly designated at 36 in the bottom wall 38 thereof, with such openings serving to transmit by capillary action the water from the pad 14 to the growing media. It will be further understood that the pot itself can be formed of a somewhat pervious material whereby capillary action effects transmission of the moisture directly through the thickness of the bottom wall 38 of the pot.

A plurality of arcuately spaced pockets commonly designated at 40 are preferably integrally formed in the tray 20, at spaced locations corresponding to the arcuate spacing of the legs 24 of the support disc. As shown in FIG. 2, the bottoms of the legs extend into the pockets, which are of course water tight, thereby locking and thus stabilizing the support disc in place. A particularly advantageous feature of the tray construction is the extension of the pockets 40 below the plane of the bottom wall 18 of the tray, thereby elevating such bottom wall from the surface supporting the entire assembly. Thus, direct moisture transfer from the otherwise contacting surfaces is avoided, and the spacing of the bottom wall from the support surface normally will accommodate sufficient circulation to prevent moisture appearing on the exterior of the bottom wall.

Although the tray 20 illustrated and described is particularly adapted to receive the support disc 12, it will be understood that a normally configured tray without the pockets could be provided, as long as the tray has a bottom diameter at least equal to the total diameter of the legs 24 of the support disc at the radially outer ends thereof. However, the specially configured tray as illustrated is preferred for the reasons noted.

The assembly and operation of the invention should e apparent from the above description. The supports 12 can be shipped separately from the pads, and a support positioned within the tray 20 and locked in place. A pad 14 is then positioned on the support disc 13 within the rim 15, with the tab 32 being preferably precut in the pad. The tab 32 is then bent downwardly so as to be submerged in water poured into the tray 20. It will be noted that the support in FIG. 2 is positioned above the water lever whereby the only means for transmission of water is by capillary action through the tab 32, with the water being uniformly transmitted to the pad for subsequent transmission by capillary action to he growing media.

Although the support disc and pad are shown having the same general diameter as the bottom of the pot, it will be understood that the support disc and pad may be smaller or larger in diameter than the pot without significantly detracting from the advantages of the invention. However, the pad is preferably of a diameter sufficiently large to cover the plurality of openings formed in the bottom wall of the pot so as to provide maximum and uniform water transfer to the growing media. Although a plurality of openings are normally formed in the bottom wall of the pot, it will be understood that a single opening may be utilized if moisture transfer is sufficient, particularly if the bottom wall of the pot is pervious to moisture transfer. If a plurality of openings are provided, they may be spaced as desired, with uniform moisture transmission being the main criterion.

In addition, the trays and supports can be conveniently nested for shipment and storage, a significant economic benefit.

I claim:

1. A plant watering device comprising:
   (a) a tray,
   (b) support means adapted to rest on the bottom of said tray, said support means including a support disc and a plurality of arcuately spaced legs extending downwardly and outwardly from said disc so as to elevate said disc from the bottom of the tray, said disc being formed with an opening therein,
   (c) means for positioning and locking said support means in said tray so as to prevent relative rotation between said support means and said tray, said positioning and locking means comprising watertight pockets formed in said tray at arcuately spaced locations therearound corresponding to the location of said legs, said legs extending into said pockets for aligning said support means and preventing relative rotative movement between said support means and said tray, said pockets extending below the bottom wall of said tray for supporting the bottom of said tray above a supporting surface, and
   (d) pad means constructed of water absorbent material positioned on said disc, said pad means having a movable tab hinged at one end thereof to said pad means and aligned with and commensurate in size with said opening in said disc, said tab being adapted to be bent downwardly through said opening in said disc for submergence in the water in the tray,
   whereby water is transmitted by capillary action from said tab to and uniformly throughout said pad for providing water to a pot positioned on said pad.

2. The watering device of claim 1 wherein said disc and said pad are of approximately the same shape.

3. The watering device of claim 2 wherein said pad and said disc are circular.

4. The watering device of claim 1 wherein said pad means comprises a pair of separate pad sections secured together, with both of said pads being of pervious material.

5. The watering device of claim 4 wherein the material of said pad sections is selected from the group comprising wool and plastic material.

6. The watering device of claim 1, wherein said support disc is formed with an upwardly extending peripheral flange within which is positioned said pad means.

7. A plant watering device comprising:
   (a) a tray,
   (b) support means adapted to rest on the bottom of said tray, said support means including a support disc and a plurality of arcuately spaced legs extending downwardly from said disc so as to elevate said disc from the bottom of the tray, said disc being formed with an opening therein,
   (c) means for positioning and locking said support means in said tray so as to prevent relative rotation between said support means and said tray, said positioning and locking means comprising watertight pockets formed in said tray at arcuately spaced locations therearound corresponding to the location of said legs, said legs extending into said pockets for aligning said support means and preventing relative rotative movement between said support means and said tray, said pockets extending below the bottom wall of said tray for supporting the bottom of said tray above a supporting surface, and
   (d) pad means constructed of water absorbent material positioned on said disc, said pad means having a movable tab hinged at one end thereof to said pad means and aligned with and commensurate in size with said opening in said disc, said tab being adapted to be bent downwardly through said opening in said disc for submergence in the water in the tray,
   whereby water is transmitted by capillary action from said tab to and uniformly throughout said pad for providing water to a pot positioned in said pad.

* * * * *